Dec. 7, 1926.
P. E. FAGERHOLM
1,609,405
ANGLE MEASURING INSTRUMENT
Filed Feb. 16, 1925
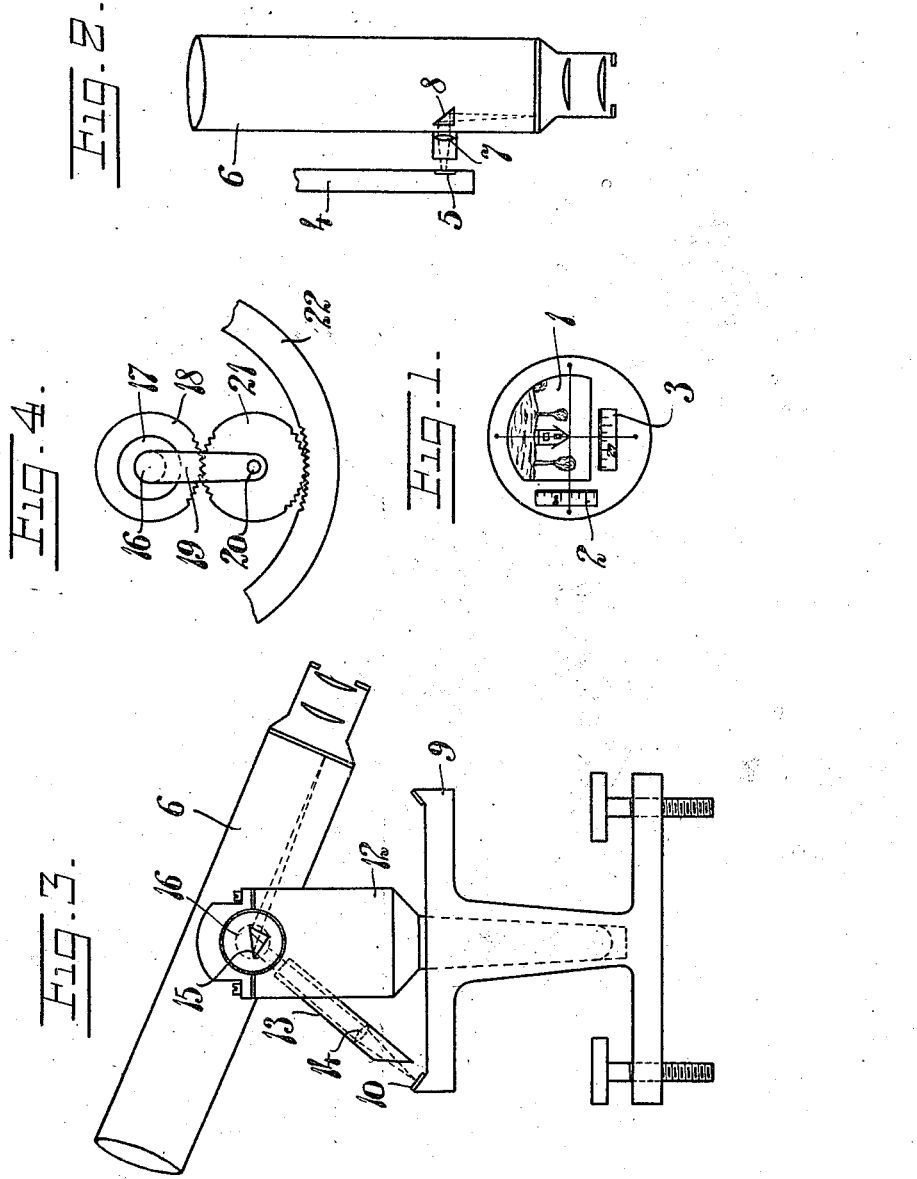
Inventor.
Per Erik Fagerholm,
By [signature] Atty.

Patented Dec. 7, 1926.

1,609,405

UNITED STATES PATENT OFFICE.

PER ERIK FAGERHOLM, OF STOCKHOLM, SWEDEN, ASSIGNOR TO ANDERS LINDAHL, OF STOCKHOLM, SWEDEN.

ANGLE-MEASURING INSTRUMENT.

Application filed February 16, 1925, Serial No. 9,626, and in Sweden February 11, 1924.

This invention relates to angle measuring instruments, as theodolites and the like, and has for its object to provide means whereby the horizontal circle of theodolites and the corresponding circle of other angle measuring instruments may be read off within the field of sight of the telescope of such instruments.

In the hitherto known designs of such instruments the means for reading off the said horizontal or equivalent circle is usually situated at a distance apart from the telescope so that, after the adjustment of the telescope relatively to the object desired is completed the observer has to move his eye off from the ocular of the telescope to the means used for reading off said circle, or recourse must be had to another person to read off the said circle.

With the object in view of avoiding the said inconvenience the invention provides an angle measuring instrument, comprising a stationary table, a horizontal graduated circle on said table, a rotatable vertical support, a telescope journalled in said support on horizontal pivots, means for introducing an image of said graduated circle in the field of sight of said telescope, and means for maintaining said image immovable in said field of sight independently of the movements of the telescope on its horizontal pivots.

The invention is illustrated in the accompanying drawing as applied to a theodolite in which:

Fig. 1 is an elevation of the hair-cross disk of the telescope.

Fig. 2 is a rear elevation of part of the telescope with a portion of the vertical circle of the instrument shown.

Fig. 3 is an elevation of the instrument with the vertical circle removed.

Fig. 4 is a detail view.

With reference to Fig. 2, illustrating a well known method to enable the vertical circle of a theodolite to be read off within the field of sight of the telescope of the theodolite, it is to be mentioned that by combining this well known method with my improved method for reading off the horizontal circle both of said circles may be read off within the field of sight of the telescope.

According to the present invention the reading off of the horizontal circle takes place through the hair-cross disk of the telescope, Fig. 1, said disk to this end being formed in addition to the opening 1, through which the object is observed, with one or two openings 2 and 3 through which the horizontal circle and the vertical circle, respectively, are adapted to be observed.

In the position shown as an example in the drawing, the telescope 6 is assumed to be directed towards the point of the gable of a house and the readings on the circles are 27°, 16′ and 8°, 8′, respectively (Fig. 1). The observer, therefore, need not move his eye off the ocular of the telescope.

Fig. 2 illustrates a well known device to enable an image of the graduated vertical circle 5 carried by the disk 4 to be visible within the field of sight of the telescope 6. The vertical disk 4 attached to the upper portion of the support of the instrument is parallel to the plane of rotation of the telescope and has its centre on the axis of rotation of the telescope. By means of the objective 7 and the prism 8 mounted within the telescope a real image of that part of the vertical circle 5 on which the reading off is to be effected will be obtained in the opening 3 of the hair-cross disk.

Fig. 3 illustrates one embodiment of the device for enabling the horizontal circle 10 on the stationary table 9 to be visible within the field of sight of the telescope 6. Rotatably mounted in a corresponding hole formed in the said stationary table 9 is a support 12. Rotatably mounted in the support 12 are two horizontal pivots 17, one of which is shown, carrying the telescope 6. Rigidly attached to the support 12 is a tube 13 extending in the direction from the horizontal circle 10 towards the centre of the pivots 17. The tube 13 contains an objective 14.

Mounted within the telescope is a shaft 16 the axis of which is in alinement of the axis of the pivots 17, said shaft 16 carrying a prism 15 so positioned and designed as to refract the image of the circle 10 as produced by the objective 14 through the opening 2 of the hair-cross disk, see Fig. 1.

The shaft 16 is geared to one of the pivots 17 by a power transmission device so designed that a certain rotation of the pivots 17 will cause a rotation of the shaft 16 in the same direction but only half as large as the rotation of the pivots 17. Due to such rotation of the prism 15 the image of the horizontal circle 10 will be maintained immovable within the field of sight of the telescope independently of the rotation of the telescope about its horizontal pivots.

In Fig. 4, I have illustrated by way of example a preferred design of power transmission device between the pivots 17 and the shaft 16. Secured to one of the pivots 17 is a toothed gear 18 and secured to shaft 16 is an arm 19 carrying the journal 20 of a toothed gear 21 of equal diameter as that of the toothed gear 18 and meshing, on the one hand, in the gear 18 and, on the other hand, in an internal toothed rim 22 secured to the support 12.

It is to be noted that several modifications may be made without departing from the principle and scope of the invention. For instance, a mirror may be substituted for the prism 15. The means for gearing shaft 16 to pivots 17 may be varied in several ways as will be readily understood by those skilled in the art.

What I claim is:—

1. An angle measuring instrument, comprising a stationary table, a horizontal graduated circle on said table, a rotatable vertical support centrally mounted with respect to said circle, a telescope movable on horizontal pivots in said support, a rotatable prism, a tube to introduce an image of said horizontal circle to said prism, and means controlled by the telescope to cause said prism upon varying the inclination of said telescope automatically to take up the correct position for maintaining said image immovable in the field of sight of said telescope.

2. An angle measuring instrument, comprising a stationary table, a horizontal graduated circle on said table, a rotatable vertical support centrally mounted with respect to said circle, a telescope movable on horizontal pivots in said support, a rotatable prism, a tube to introduce an image of said horizontal circle to said prism, and gearing between said prism and said horizontal pivots so designed as to cause said prism upon varying the inclination of said telescope automatically to take up the correct position for maintaining said image immovable in the field of sight of said telescope.

In testimony whereof I have signed my name.

PER ERIK FAGERHOLM.